(12) United States Patent
Markman et al.

(10) Patent No.: US 7,706,483 B2
(45) Date of Patent: Apr. 27, 2010

(54) CARRIER PHASE AMBIGUITY CORRECTION

(75) Inventors: Ivonete Markman, Carmel, IN (US); Gabriel Alfred Edde, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 818 days.

(21) Appl. No.: 11/579,689

(22) PCT Filed: Mar. 29, 2005

(86) PCT No.: PCT/US2005/010519
§ 371 (c)(1),
(2), (4) Date: Nov. 6, 2006

(87) PCT Pub. No.: WO2005/114892
PCT Pub. Date: Dec. 1, 2005

(65) Prior Publication Data
US 2008/0292004 A1 Nov. 27, 2008

Related U.S. Application Data

(60) Provisional application No. 60/570,298, filed on May 12, 2004, provisional application No. 60/570,295, filed on May 12, 2004.

(51) Int. Cl.
*H03D 1/00* (2006.01)
(52) U.S. Cl. ...................................... 375/343; 375/340
(58) Field of Classification Search ................. 375/343, 375/204.28, 232, 340, 324; 384/726; 702/89; 455/265
See application file for complete search history.

(56) References Cited

U.S. PATENT DOCUMENTS

| 5,541,966 | A  | * | 7/1996  | Bolla et al. ................. 375/329 |
| 5,604,541 | A  |   | 2/1997  | Kim et al. |
| 5,706,057 | A  |   | 1/1998  | Strolle et al. |
| 6,175,391 | B1 |   | 1/2001  | Kwak |
| 6,493,409 | B1 |   | 12/2002 | Lin et al. |
| 2003/0194024 | A1 |   | 10/2003 | Edde |
| 2006/0153296 | A1 | * | 7/2006  | Deng .................... 375/240.12 |
| 2007/0229713 | A1 | * | 10/2007 | Markman et al. ........... 348/726 |
| 2008/0260014 | A1 | * | 10/2008 | Yang et al. .................. 375/232 |

FOREIGN PATENT DOCUMENTS

EP 0984577 3/2000

OTHER PUBLICATIONS

"Guide to the Use of the ATSC Digital Television Standard" 4, Oct. 1995, pp. 1-135, XP002968652.
Search Report dated Jun. 16, 2005.

* cited by examiner

*Primary Examiner*—Khai Tran
(74) *Attorney, Agent, or Firm*—Robert D. Shedd; Joseph J. Opalach

(57) ABSTRACT

A receiver comprises a demodulator for providing a demodulated signal and a centroid calculator responsive to the demodulated signal for identifying a correct carrier phase for use in the centroid calculation and in removing carrier phase ambiguity in the demodulator. In addition, the centroid calculator may include a limiter.

19 Claims, 15 Drawing Sheets

FIG. 8

TABLE ONE

| Segment sync pattern, $S$: | $[+5 -5 -5 +5]$ |
| Scaled segment sync pattern, $S_s = S/5$; | $[+1 -1 -1 +1]$ |
| $C = correlation(S_s, S_s)$ | $[+1 -2 -1 +4 -1 -2 +1]$ |
| $C_h = correlation(S_s, Hilbert(S_s))$ | $[+1\ 0 -3\ 0 +3\ 0 -1]$ |

CARRIER PHASE AMBIGUITY CORRECTION

This application is a National Stage Application and claims the benefit, under 35 U.S.C. §365 of International Application PCT/US2005/10519 filed Mar. 29, 2005, which was published in accordance with PCT Article 21(2) on Dec. 1, 2005 in English, and which claims the benefit of U.S. provisional patent application Nos. 60/570,298 and 60/570,295, which were both filed on May 12, 2004. This application is related to, commonly assigned, U.S. patent applications Ser. No. 11/579,845 SYMBOL TIMING AMBIGUITY CORRECTION, filed on Nov. 8, 2006; and Ser. No. 11/596,339 entitled COMPLEX CORRELATOR FOR A VESTIGIAL SIDEBAND MODULATED SYSTEM, filed on Nov. 9, 2006.

BACKGROUND OF THE INVENTION

The present invention generally relates to communications systems and, more particularly, to a receiver.

In modern digital communication systems like the ATSC-DTV (Advanced Television Systems Committee-Digital Television) system (e.g., see, United States Advanced Television Systems Committee, "ATSC Digital Television Standard", Document A/53, Sep. 16, 1995 and "Guide to the Use of the ATSC Digital Television Standard", Document A/54, Oct. 4, 1995), advanced modulation, channel coding and equalization are usually applied. In the receiver, demodulators generally have carrier phase and/or symbol timing ambiguity. Equalizers are generally a DFE (Decision Feedback Equalizer) type or some variation of it and have a finite length. In severely distorted channels, it is important to know the virtual center of the channel impulse response to give the equalizer the best chance of successfully processing the signal and correcting for distortion. One approach is to use a centroid calculator that calculates the channel virtual center for an adaptive equalizer based on a segment synchronization (sync) signal. Another approach is to use a centroid calculator that calculates the channel virtual center for an adaptive equalizer based on a frame sync signal.

SUMMARY OF THE INVENTION

We have observed that the above-mentioned approaches for determining the channel virtual center do not address the impact of wrong carrier phase on the data that is provided as an input to the centroid calculator and consequently, on the centroid estimate. In other words, the above-mentioned approaches do not address the effect of demodulator carrier phase ambiguity in the centroid calculation and do not attempt to correct for this ambiguity.

Therefore, and in accordance with the principles of the invention, a receiver comprises a demodulator for providing a demodulated signal and a centroid calculator responsive to the demodulated signal for identifying a correct carrier phase for use in removing carrier phase ambiguity in the demodulator.

In an embodiment of the invention, an ATSC receiver comprises a demodulator, a centroid calculator and an adaptive equalizer. The demodulator demodulates a received ATSC-DTV signal and provides a demodulated signal. The centroid calculator processes the demodulated ATSC-DTV signal and identifies a correct carrier phase of the demodulated signal for use in removing carrier phase ambiguity in the demodulator. Illustratively, the centroid calculator uses a training signal within the demodulated ATSC-DTV signal (e.g., either the segment sync or the frame sync) and identifies the correct carrier phase, which can also improve the subsequent calculation of the channel virtual center for the adaptive equalizer.

In an additional embodiment of the invention, the carrier phase ambiguity is also corrected prior to the centroid calculation. Also, in accordance with a feature of the invention, a centroid calculator comprises an internal limiter, which improves performance.

BRIEF DESCRIPTION OF THE DRAWINGS

FIG. 8 shows Table One;

DETAILED DESCRIPTION

Figure 1:
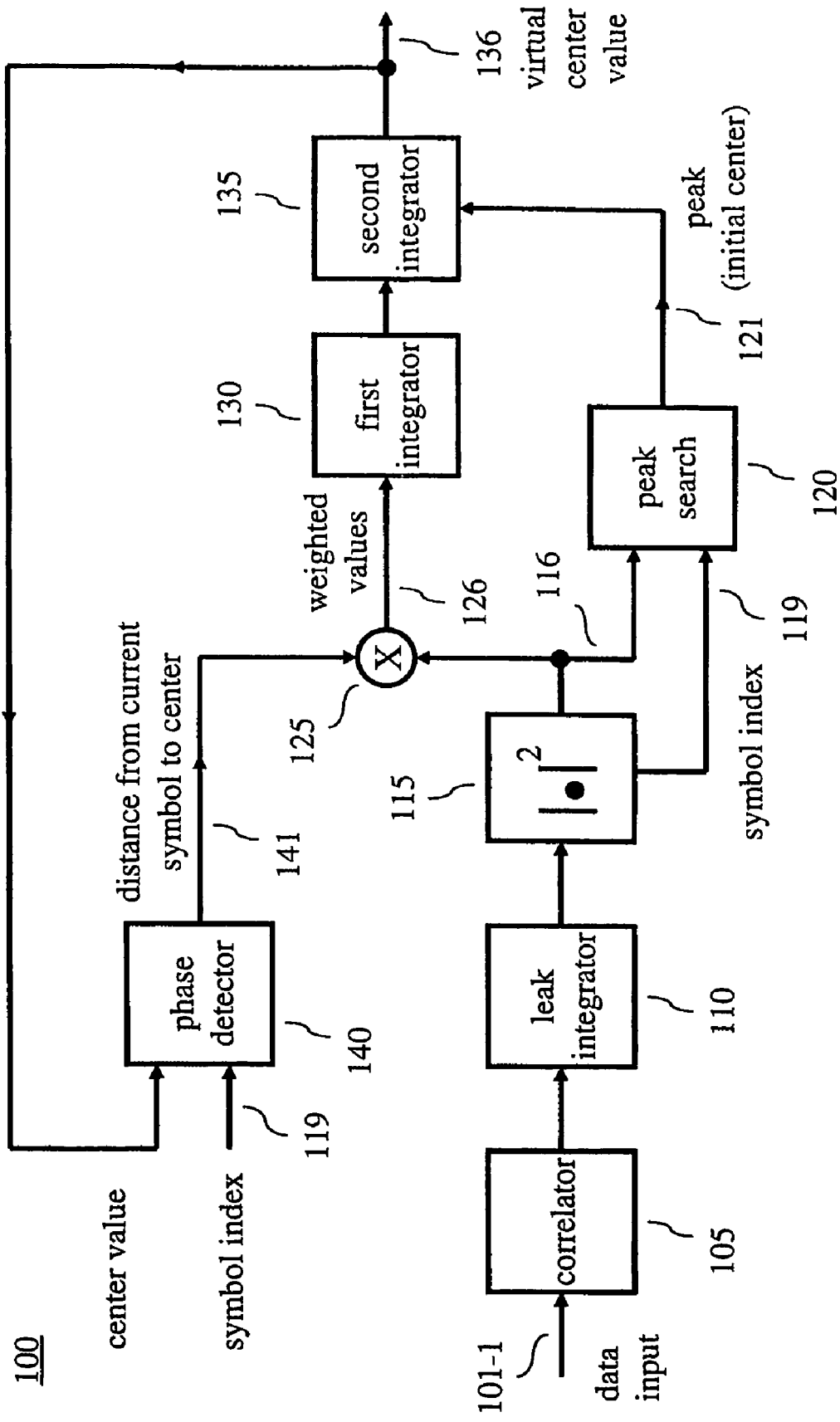
FIG. 1 shows a block diagram of a centroid calculator.

Other than the inventive concept, the elements shown in the figures are well known and will not be described in detail. Also, familiarity with television broadcasting and receivers is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Likewise, other than the inventive concept, transmission concepts such as eight-level vestigial sideband (8-VSB), Quadrature Amplitude Modulation (QAM), and receiver components such as a radio-frequency (RF) front-end, or receiver section, such as a low noise block, tuners, demodulators, correlators, leak integrators and squarers is assumed. Similarly, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements. Before describing the inventive concept, a block diagram of a centroid calculator 100 is shown in FIG. 1 for use in an ATSC-DTV system. Centroid calculator 100 comprises correlator 105, leak integrator 110, squarer 115, peak search element 120, multiplier 125, first integrator 130, second integrator 135 and phase detector 140. Centroid calculator 100 is based on the segment sync signal, one sample-per-symbol and a data input signal 101-1 comprising only the in-phase (real) component. The data input signal 101-1 represents a demodulated received ATSC-DTV signal provided by a demodulator (not shown).

The data input signal 101-1 is applied to correlator 105 (or segment sync detector 105) for detection of the segment sync signal (or pattern) therein. The segment sync signal has a repetitive pattern and the distance between two adjacent segment sync signals is rather large (832 symbols). As such, the segment sync signal can be used to estimate the channel impulse response, which in turn is used to estimate the channel virtual center or centroid. Segment sync detector 105 correlates data input signal 101-1 against the characteristic of the ATSC-DTV segment sync, that is, [1 0 0 1] in binary representation, or [+5 −5 −5 +5] in VSB symbol representation. The output signal from segment sync detector 105 is then applied to leak integrator 110. The latter has a length of 832 symbols, which equals the number of symbols in one segment. Since the VSB data is random, the integrator values at data symbol positions will be averaged towards zero. However, since the four segment sync symbols repeat every 832 symbols, the integrator value at a segment sync location will grow proportionally to the signal strength. If the channel impulse response, presents multipath or ghosts, the segment sync symbols will appear at those multipath delay positions. As a result, the integrator values at the multipath delay positions will also grow proportionally to the ghost amplitude. The leak integrator is such that, after a peak search is performed, it subtracts a constant value every time the integrator adds a new number. This is done to avoid hardware overflow. The 832 leak integrator values are squared by squarer 115. The resultant output signal, or correlator signal 116, is sent to peak search element 120 and multiplier 125. (It should be noted that instead of squaring, element 115 may provide the absolute value of its input signal.)

As each leak integrator value (correlator signal 116) is applied to peak search element 120, the corresponding symbol index value (symbol index 119) is also applied to peak search element 120. The symbol index 119 is a virtual index that may be originally reset at zero and is incremented by one for every new leak integrator value, repeating a pattern from 0 to 831. Peak search element 120 performs a peak search over the 832 squared integrator values (correlator signal 116) and provides peak signal 121, which corresponds to the symbol index associated with the maximum value among the 832 squared integrator values. The peak signal 121 is used as the initial center of the channel and is applied to second integrator 135 (described below).

The leak integrator values (correlator signal 116) are also weighted by the relative distance from the current symbol index to the initial center and a weighted center position is then determined by a feedback loop, or centroid calculation loop. The centroid calculation loop comprises phase detector 140, multiplier 125, first integrator 130 and second integrator 135. This feedback loop starts after the peak search is performed and second integrator 135 is initialized with the initial center or peak value. Phase detector 140 calculates the distance (signal 141) between the current symbol index (symbol index 119) and the virtual center value 136. The weighted values 126 are calculated via multiplier 125 and are fed to first integrator 130, which accumulates the weighted values for every group of 832 symbols. As noted above, second integrator 135 is initially set to the peak value and then proceeds to accumulate the output of first integrator 130 to create the virtual center value, or centroid, 136. All integrators in FIG. 1 have implicit scaling factors.

Once the virtual center value 136 is determined, the VSB reference signals, such as the segment sync and the frame sync signal, are locally re-generated (not shown) in the receiver to line up at the virtual center. As a result, taps will grow in the equalizer to equalize the channel such that the equalized data output will be lined up at the virtual center.

Extensions of the system described above with respect to FIG. 1 to a complex data input signal (in-phase and quadrature components), two-samples per symbol or to a frame sync based design are easily derived from FIG. 1.

Figure 2:
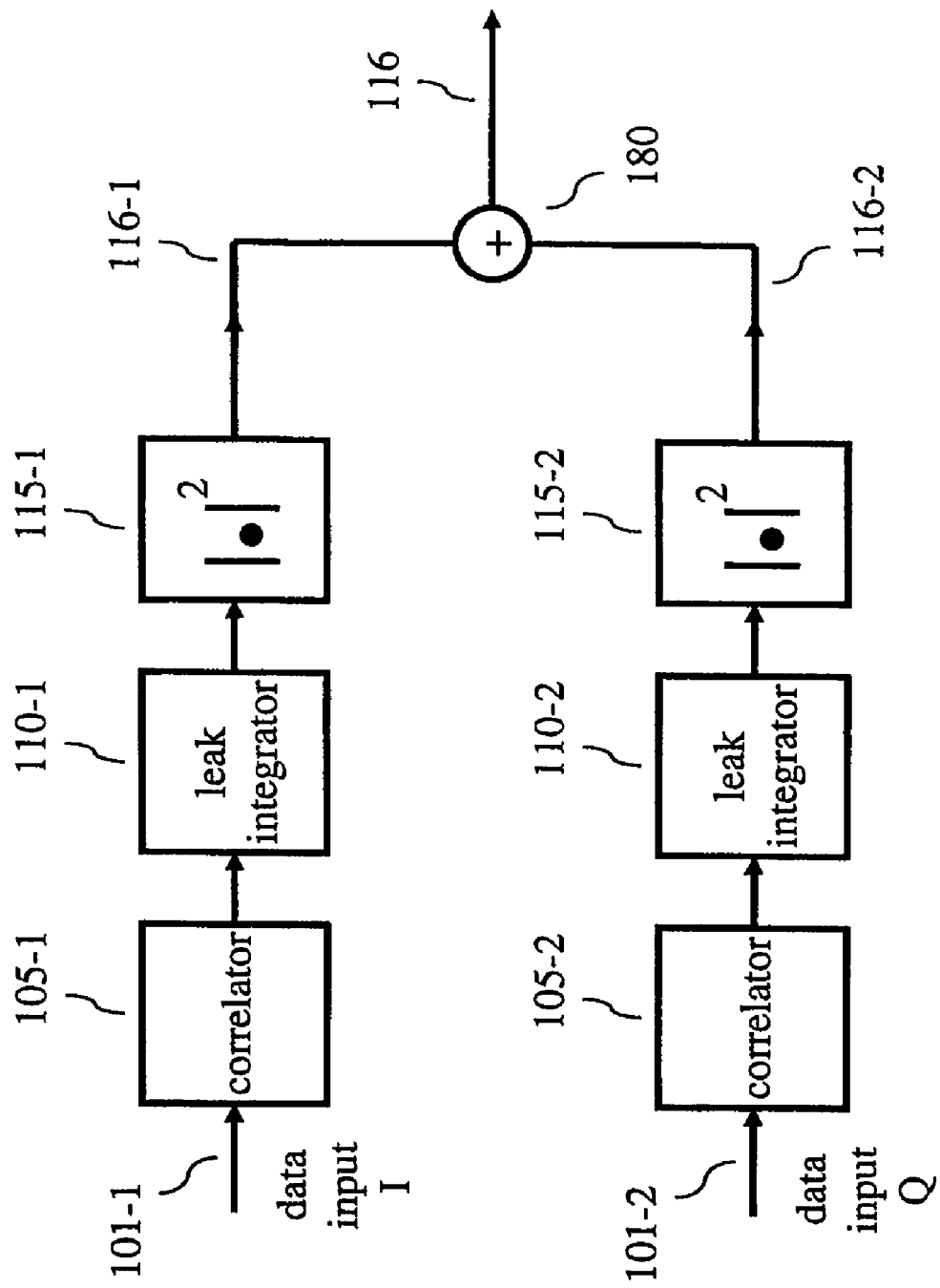
FIG. 2 shows a block diagram for processing a complex signal for use in a complex centroid calculator.

For example, if the data input signal is complex, the centroid calculator (now also referred to as a "complex centroid calculator") separately processes the in-phase (I) and quadrature (Q) components of the input data signal as shown in FIG. 2. In particular, the in-phase component (101-1) of the input data signal is processed via correlator (segment sync detector) 105-1, leak integrator 110-1 and squarer 115-1; while the quadrature component (101-2) of the input data signal is processed via correlator (segment sync detector) 105-2, leak integrator 110-2 and squarer 115-2. Each of these elements function in a similar fashion to those described above in FIG. 1. Although not shown in the figure, the symbol index can be generated from either squarer element. The output signals from each squarer (115-1 and 115-2) are added together via adder 180 to provide correlator signal 116 and the remainder of the processing is the same as described above with respect to FIG. 1.

With respect to a two-sample-per-symbol centroid calculator, T/2 spacing is illustratively used (where T corresponds to the symbol interval). For example, the segment sync detector has T/2 spaced values that match with a T/2 spaced segment sync characteristic, the leak integrators are 2×832 long and the symbol index follows the pattern 0, 0, 1, 1, 2, 2, ..., 831, 831, instead of 0, 1, 2, ..., 831.

Finally, for a centroid calculator based on the frame sync signal, the following should be noted. Since the frame/field sync signal is composed of 832 symbols and arrives every 313 segments this is longer than any practical multipath spread in a channel, hence, there is no problem in determining the position of any multipath signals. An asynchronous PN511 correlator may be used to measure the channel impulse response (if using the PN511 alone, out of the 832 frame sync symbols), as opposed to the segment sync detector in FIG. 1. (PN511 is a pseudo-random number sequence and described in the earlier-noted ATSC standard.) The additional processing is similar to that described above for FIG. 1 except that the processing is performed for the duration of at least one entire field. The correlation values are sent to the peak search function block to perform a peak search over one field time. The symbol index of this peak value is thus to be used as the initial virtual center point. Once the initial center point is determined, then the correlation results are analyzed only when a correlation output is above a pre-determined threshold and within a certain range before and after the initial virtual center point. For example, +/−500 symbols around the initial center position that the correlation output is above the pre-determined values. The exact range is determined by both the practical channel impulse response length that is expected to be encountered in a real environment and the length of the available equalizer. The remainder of the processing is the same as described earlier for FIG. 1.

We have observed that the above-mentioned approaches for determining the channel virtual center do not address the impact of wrong carrier phase on the data that is provided as an input to the centroid calculator and consequently, on the centroid estimate. In other words, the above-mentioned approaches do not address the effect of demodulator carrier phase ambiguity in the centroid calculation and do not attempt to correct for this ambiguity.

Therefore, and in accordance with the principles of the invention, a receiver comprises a demodulator for providing a demodulated signal and a centroid calculator responsive to the demodulated signal for identifying a correct carrier phase for use in removing carrier phase ambiguity in the demodulator.

Figure 3:
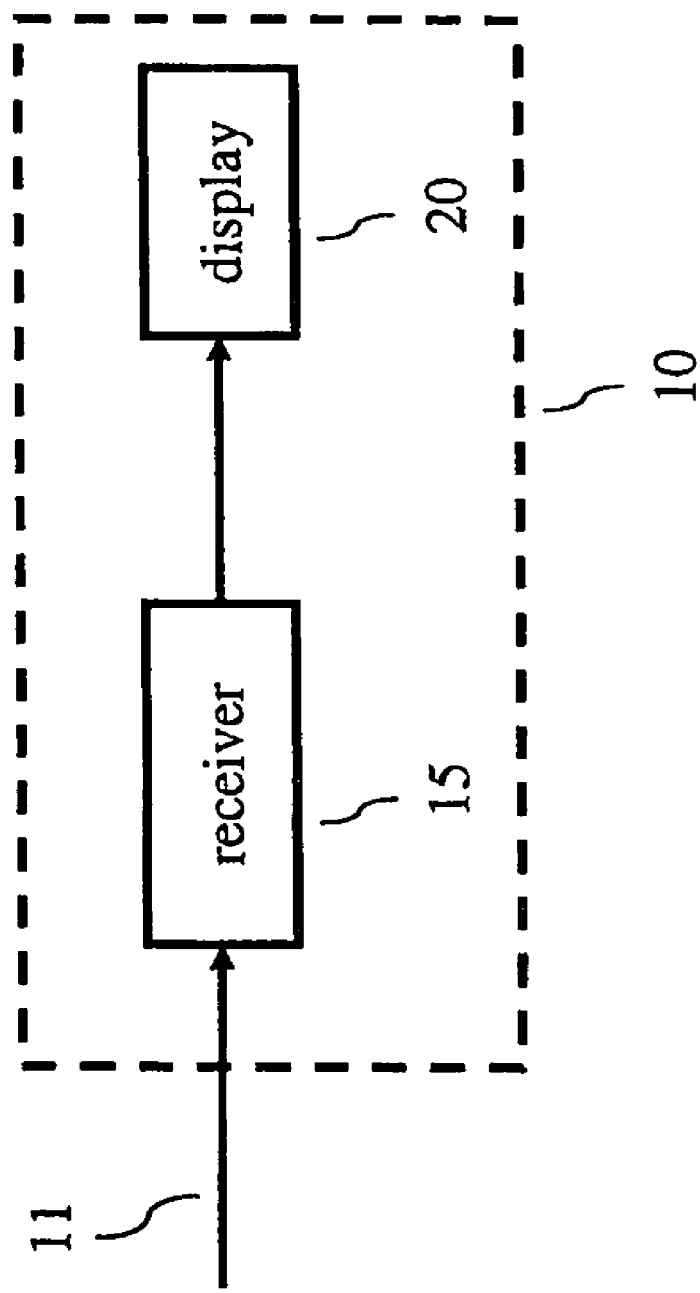
FIG. 3 shows an illustrative high-level block diagram of a receiver embodying the principles of the invention.

A high-level block diagram of an illustrative television set 10 in accordance with the principles of the invention is shown in FIG. 3. Television (TV) set 10 includes a receiver 15 and a display 20. Illustratively, receiver 5' is an ATSC-compatible receiver. It should be noted that receiver 15 may also be NTSC (National Television Systems Committee)—compatible, i.e., have an NTSC mode of operation and an ATSC mode of operation such that TV set 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon.

Figure 4:
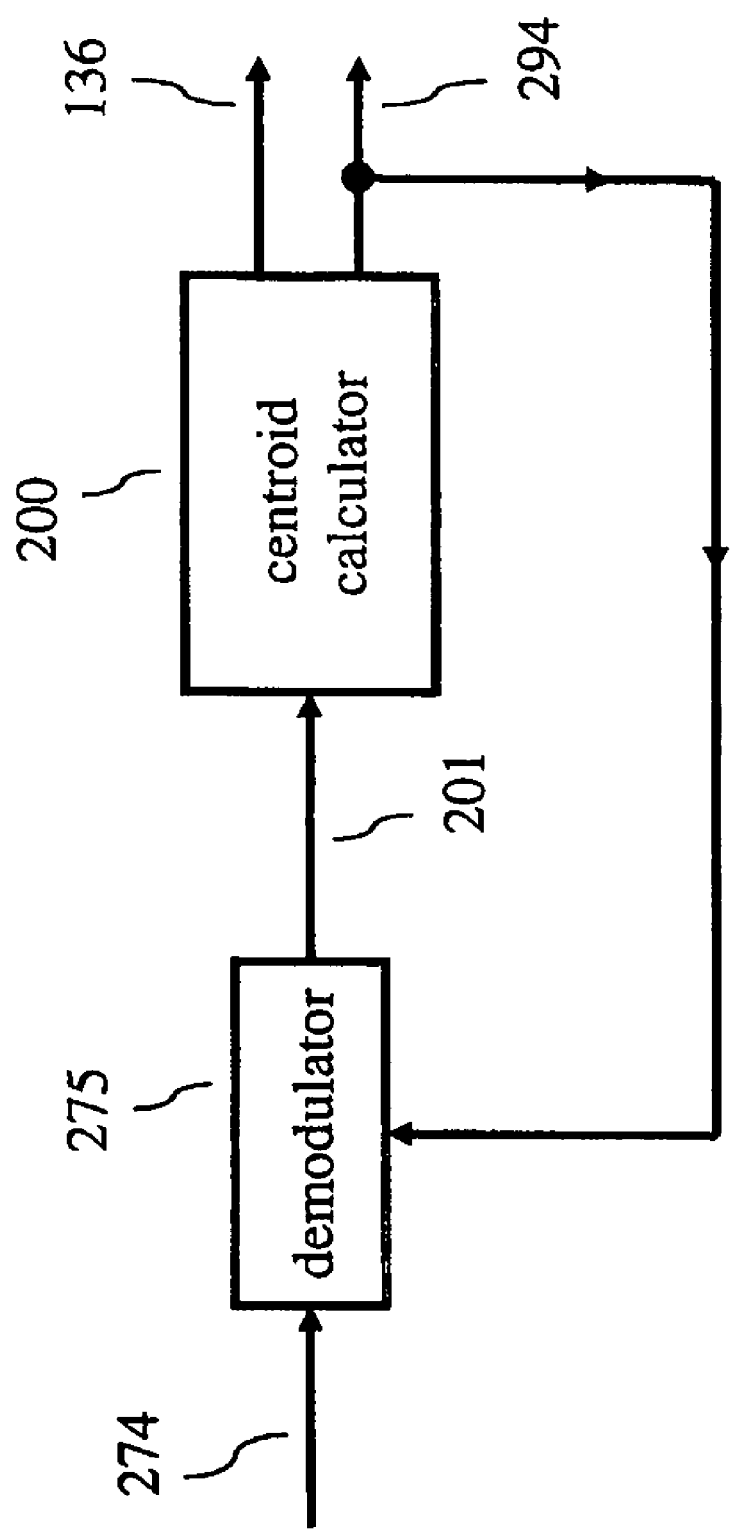
FIGS. 4-6 show illustrative portions of a receiver embodying the principles of the invention.

In accordance with the principles of the invention, receiver 15 includes a centroid calculator that corrects for carrier phase ambiguity. An illustrative block diagram of the relevant portion of receiver 15 is shown in FIG. 4. A demodulator 275 receives a signal 274 that is centered at an IF frequency ($F_{IF}$) and has a bandwidth equal to 6 MHz (millions of hertz). Demodulator 275 provides a demodulated received ATSC-DTV signal 201 to centroid calculator 200, which, and in accordance with the principles of the invention, identifies a correct carrier phase for use in removing carrier phase ambiguity in the demodulator. In particular, centroid calculator 200 provides carrier phase information via signal 294 to demodulator 275 to correct for carrier phase ambiguity therein. As a result, the subsequent calculation of the virtual center value 136 for use by an adaptive equalizer (not shown) is also improved. (It should be noted that other processing blocks of receiver 15 not relevant to the inventive concept are not shown herein, e.g., an RF front end for providing signal 274, etc.)

Figure 5:
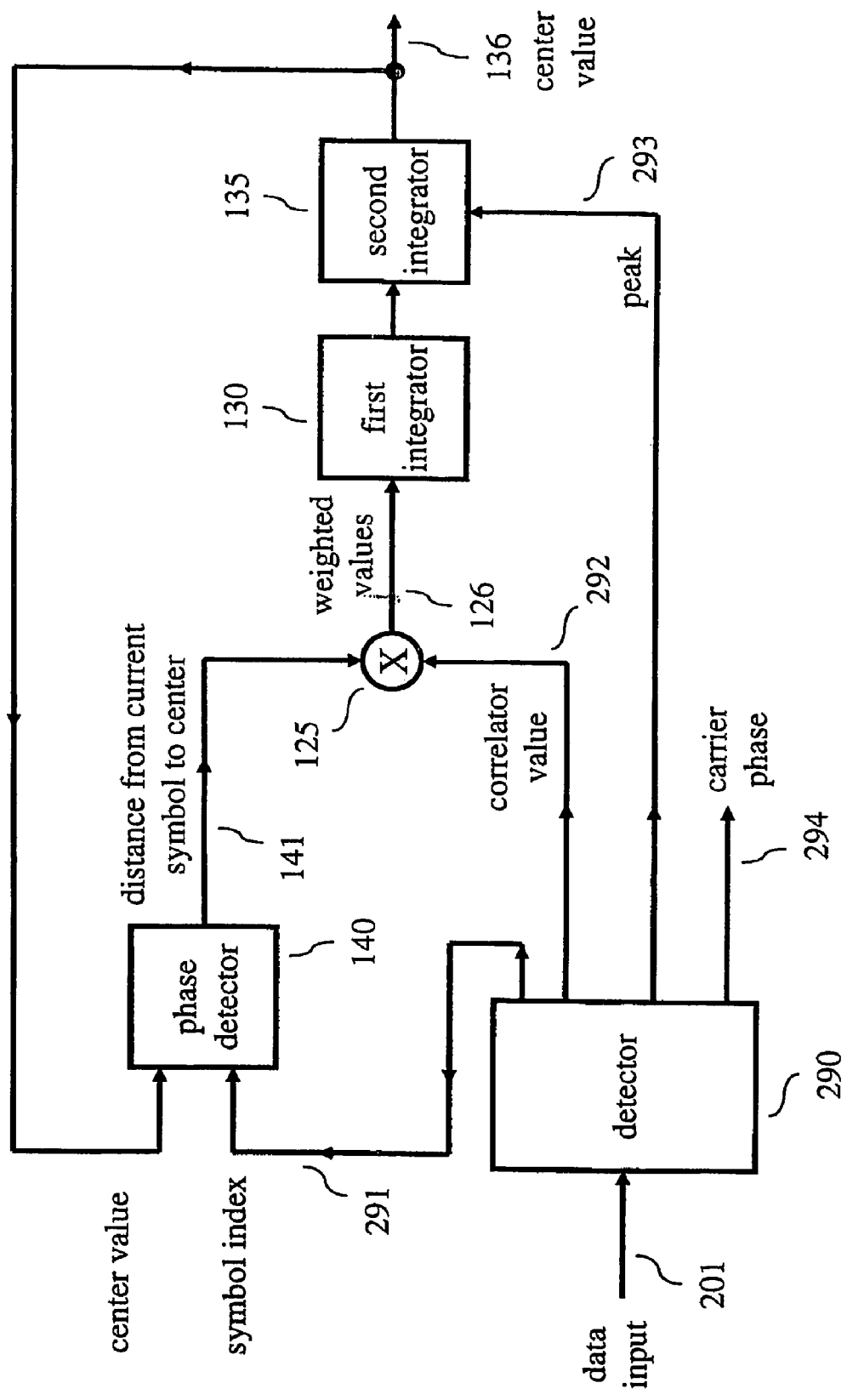

Referring now to FIG. 5, an illustrative block diagram of centroid calculator 200 is shown. Centroid calculator 200 comprises detector 290, phase detector 140, multiplier 125, first integrator 130 and second integrator 135. Except for detector 290, centroid calculator 200 is similar in operation to centroid calculator 100 (describer earlier). A data input signal 201, which represents the demodulated received ATSC-DTV signal provided by demodulator 275, is applied to detector 290. The latter enables centroid calculator 200 to correct for carrier phase ambiguity and, illustratively, provide carrier phase information via signal 294.

Figure 6:
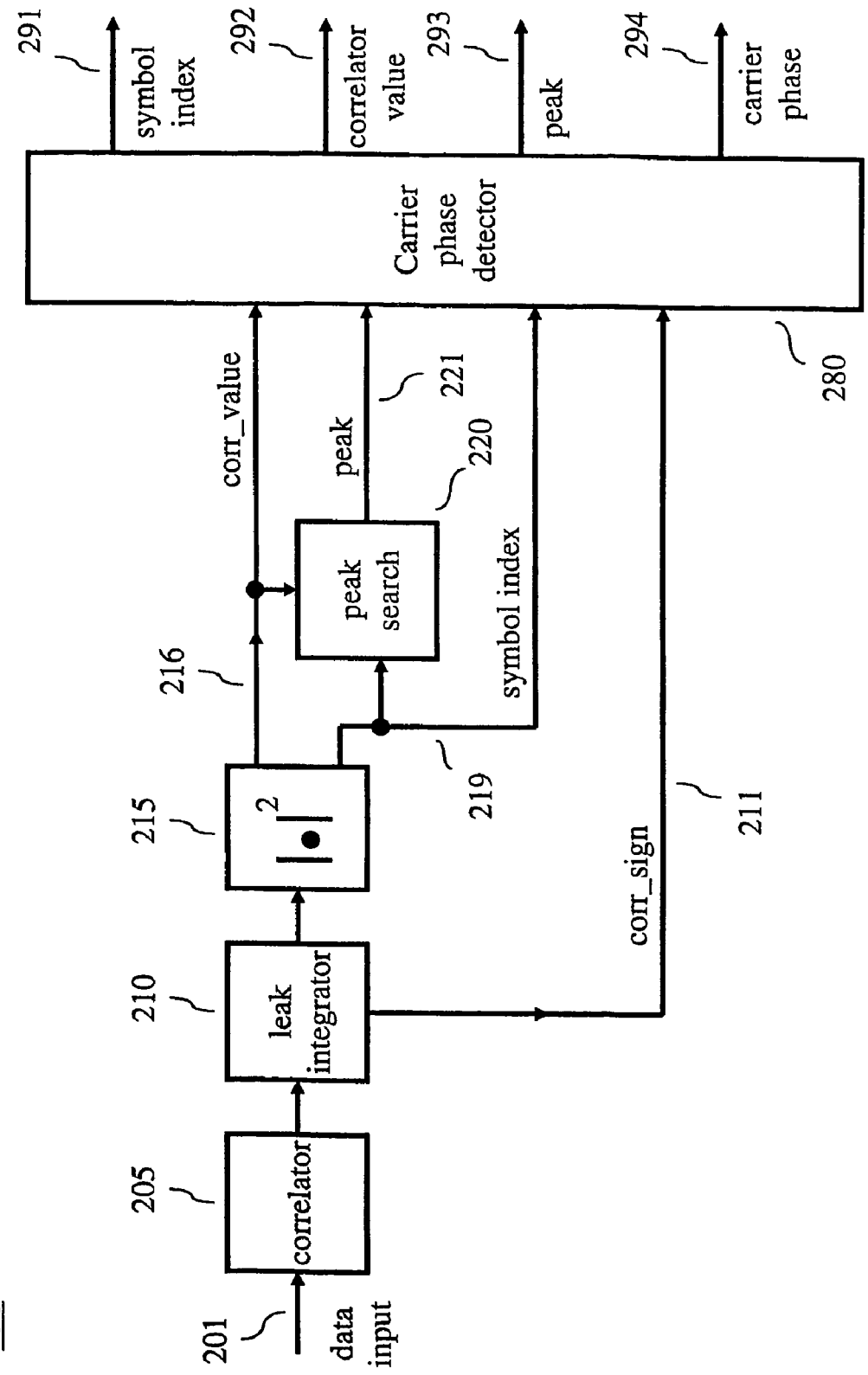

Turning now to FIG. 6, an illustrative block diagram of detector 290 in accordance with the principles of the invention is shown. In this example, detector 290 operates on one sample per symbol period, T, and uses the in-phase component of the data input signal 201. In this regard, the demodulator clock (not shown) may have a frequency equal to the symbol rate or higher. If the clock frequency is higher than the symbol rate, a sample enable (not shown) identifies when the samples are available with respect to the clock. For the sake of simplicity and without loss of generality, it is assumed that the clock frequency is equal to the symbol rate.

While a particular processing path for a sample (e.g., segment sync detector, leak integrator and squarer) in FIG. 6 is similar to that shown in FIG. 1, there are some key differences in the arrangement shown in FIG. 6 that enable detector 290 to identify the correct carrier phase. In this regard, correlator (segment sync detector) 205, squaring element 215 and peak search element 220 are identical to the corresponding elements shown in FIG. 1. Likewise, leak integrator 210 is similar to the one in FIG. 1, but with one added feature: a value for the correlated sign (corr_sign 211) is associated with a respective output signal (corr_value 216) from squarer 215. This is necessary since, while the correlated value from leak integrator 210 includes sign information, this sign information is lost after the squaring function (element 215). Thus, providing corr_sign 211 restores this information. Although not necessary to the inventive concept, the following convention is used herein: the value of corr_sign signal 211 is equal to 0 if the output signal of leak integrator 210 is greater than or equal to 0 and the value of corr_sign signal 211 is equal to 0 if the output signal of leak integrator 210 is less than 0.

As can be observed from FIG. 6, the correlator value (corr_value signal 216), peak signal 221, symbol index signal 219 and correlated sign (corr_sign signal 211) are processed by carrier phase detector 280. As described below, carrier phase detector 280 decides whether there is carrier phase ambiguity and what this carrier phase might be. The complexity of carrier phase detector 280 depends on the possible carrier phase ambiguity.

For a carrier phase ambiguity of 180 degrees, signal 201 has only two possible carrier phases, 0° and 180°, the former being the correct phase. In this case carrier phase detector 280 is simple to implement and is illustrated in the flow chart of FIG. 7. In addition, this type of carrier phase ambiguity does not affect the centroid calculator due to the squaring function. In step 305, carrier phase detector 280 waits for completion of the peak search. Once the peak search is complete, carrier phase detector 280 provides the signals applied thereto, symbol index 219, corr_value 216, peak signal 221 and corr_sign signal 211, as the corresponding output signals in step 310. In particular, symbol index 291, correlator value 292, peak 293 and carrier phase signal 294, respectively. The output signals 291, 292 and 293 are then applied to the remainder of the elements of centroid calculator 200 as illustrated in FIG. 5 and the processing proceeds as described earlier for the centroid calculator shown in FIG. 1.

In the case where the identified carrier phase is 180°, all the symbols (data input 201) from demodulator 275 will be inverted, and the correlator and leak integrator output signals illustrated in FIG. 5 will be negative, which is indicated by the value of corr_sign signal 211. As such, by providing carrier phase signal 294 to demodulator 275, the latter can then invert its symbol output if the value of carrier phase signal 294 is equal to "I" and thereby remove the 180° phase ambiguity. Thus, demodulator 275 can correct its output signal for use by processing blocks following (or downstream from) demodulator 275 (e.g., an equalizer, trellis decoder, deinterleaver, etc. (all not shown)).

However, in the case of a carrier phase ambiguity of 90°, the implementation of carrier phase detector 280 is different. In this case, the demodulator ambiguity has four possible carrier phases: 0°, 90°, 180° and 270° (or −90°). In order to identify the correct carrier phase, it is important to understand the relationship between the phase and the particular sync signal used by the correlator. In the illustrative embodiment of FIG. 6, the sync signal used is the segment sync signal. The relationship between carrier phase and the segment sync signal is shown in Table One of FIG. 8. Table One shows the segment sync signal, the scaled segment sync signal, the correlation of the scaled segment sync with itself (C) and the correlation of the scaled segment sync with the Hilbert of itself ($C_h$). As known in the art, a Hilbert operation performs a 90° phase rotation of a signal, which is equivalent to its quadrature component.

Figure 9:
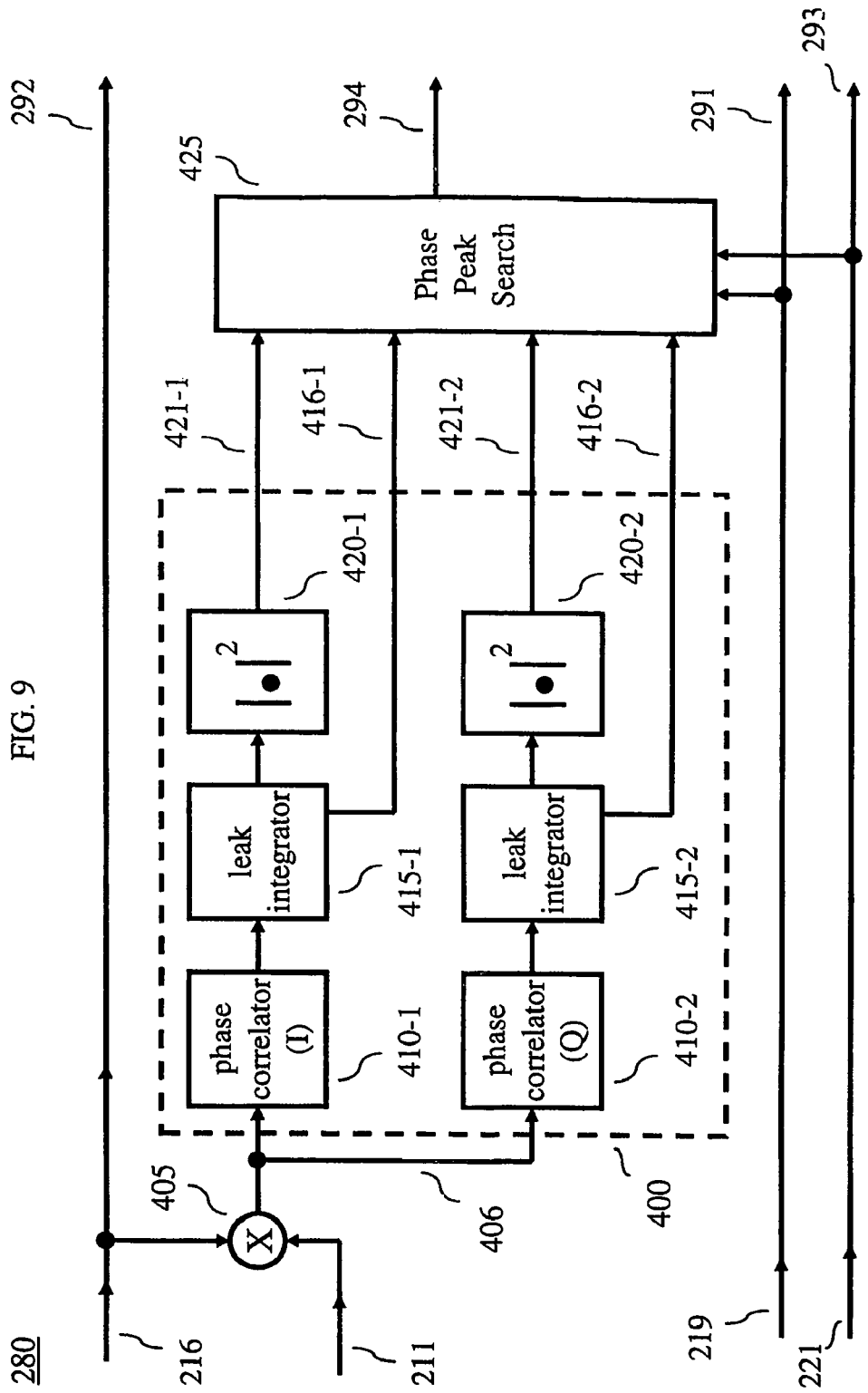
FIG. 9 shows another illustrative embodiment of a carrier phase detector in accordance with the principles of the invention.

An illustrative block diagram of a carrier phase detector 280 in accordance with the principles of the invention for resolving a 90° carrier phase ambiguity is shown in FIG. 9. Carrier phase detector 280 comprises multiplier 405, phase correlator inphase (I) 410-1, phase correlator quadrature (Q) 410-2, leak integrators 415-1 and 415-2, squarers 420-1 and 420-2 and phase peak search element 425. As can be observed from FIG. 9, the input signals corr_value 216, symbol index 219 and peak signal 221 are provided as output signals 292, 293 and 291, respectively. Corr_value signal 216 and corr_sign signal 211 are applied to multiplier 405. The resulting product 406 represents the correlator value (corr_value signal 216) but, now, with the correct sign. Product 406 is applied to phase correlator (I) 410-1 and phase correlator (Q) 410-2. These elements correlate product 406 with the patterns C and $C_h$, respectively (C and $C_h$ are shown in Table One of FIG. 8). In particular, phase correlator (I) 410-1 compares the data representing product 406 with pattern C, which represents the expected value for the in-phase component of the VSB signal; while phase correlator (Q) 410-2 compares the data representing product 406 with pattern $C_h$, which represents the expected value for the quadrature component of the VSB signal. The resulting output signal from correlator 410-1 is then processed by leak integrator 415-1 and squarer 420-1. The latter provides an in-phase correlated value 421-1. Likewise, the resulting output signal from correlator 410-2 is then processed by leak integrator 415-2 and squarer 420-2. The latter provides a quadrature correlated value 421-2. These leak integrators and squaring elements are similar to those elements with like functions described earlier. Leak integrators 415-1 and 415-2 also provide a corr_I_sign signal 416-1 and a corr_Q_sign signal 416-2. These signals are similar to the earlier mention corr_sign signal 211 and indicate the sign of signals 421-1 and 421-2, respectively. The above-described elements operate until a peak search is completed by peak search element 220 of FIG. 6 and a peak is determined. Once the peak is determined, and in accordance with the principles of the invention, phase peak search element 425 determines whether there is a carrier phase offset and identifies the value of the phase offset.

Figure 10:
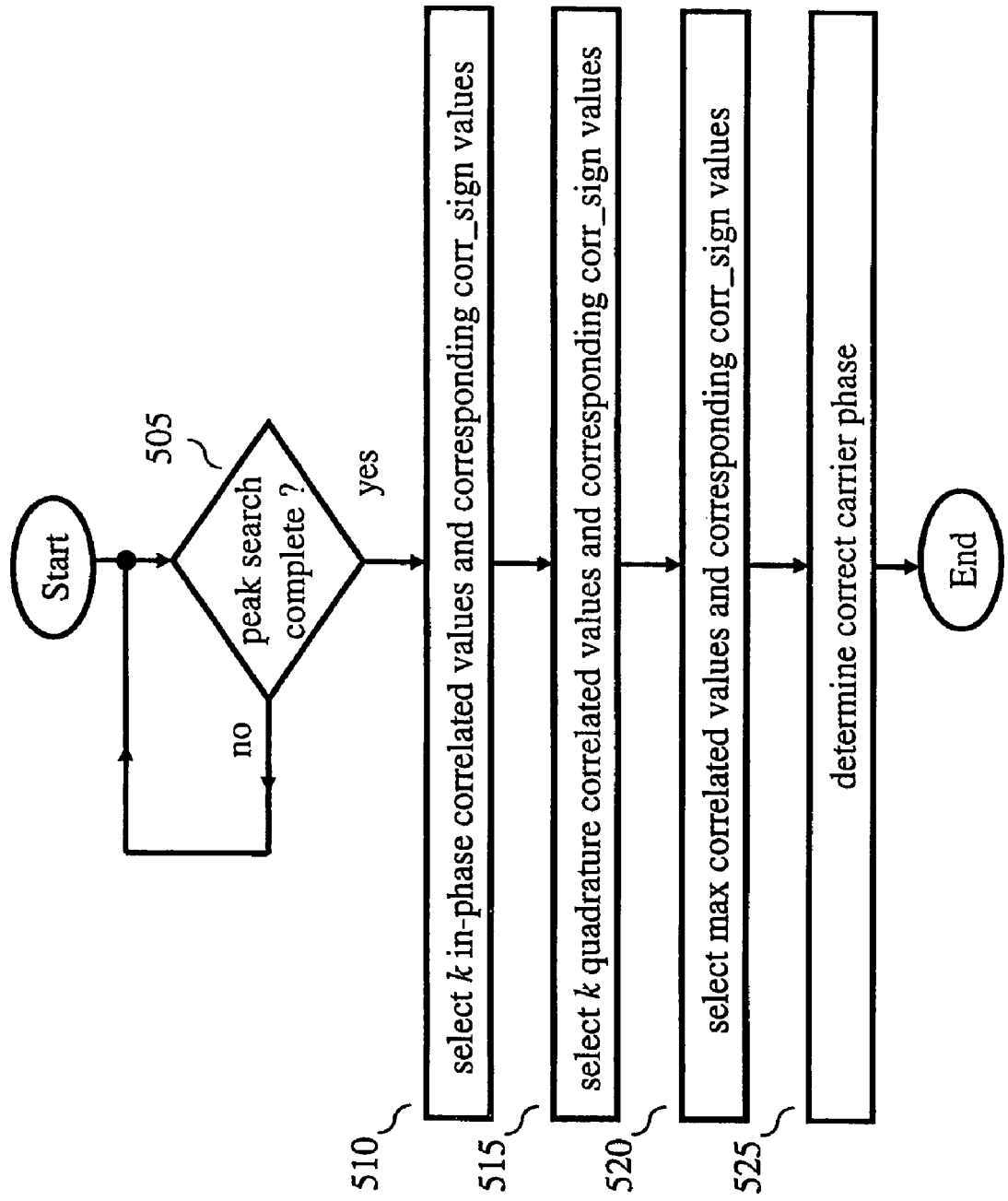
FIG. 10 shows another illustrative flow chart for use in a receiver in accordance with the principles of the invention.

Turning now to FIG. 10, an illustrative flow chart for use in phase peak search element 425 to determine a correct carrier phase is shown. In step 505, phase peak search element 425 waits for completion of the peak search. It should be noted that in step 505, phase peak search element 425 stores the signal values for signals 421-1, 416-1, 421-2 and 416-2, along with the associated symbol index value provided by symbol index signal 219. Once the peak search is complete, phase peak search element 505 selects k in-phase correlated values 421-1 (along with the respective corr_I_sign values 416-1) about the peak location in step 510. For example, for k=3, phase peak search element 425 selects the in-phase correlated values 421-1 (and respective corr_I_sign values 416-1) located at the peak, peak −1 and peak +1 positions, as provided by the value of symbol index 219 for the peak value 221. Similarly, in step 515, phase peak search element 505 selects k quadrature correlated values 421-2 (along with the respective corr_Qhd —sign values 416-2) about the peak location. For example, for k=3, phase peak search element 425 selects the quadrature correlated values 421-2 (and respective corr_Q_sign values 416-2) located at the peak, peak −1 and peak +1 positions, as provided by the value of symbol index 219 for the peak value 221. In step 520, phase peak search element 425 determines the maximum correlated value and the associated sign value from the k+k values selected in steps 510 and 515. In step 525, phase peak search element 425 determines the correct carrier phase from the maximum correlated value and the associated sign value and provides the appropriate value for carrier phase signal 294. In particular, if the maximum correlated value is an in-phase correlated value 421-1, then the associated corr_I_sign value 416-1 determines the correct carrier phase. For example, if the corr_I_sign value 416-1 is equal to 0 (a positive value), then the correct carrier phase is 0° and carrier phase signal 294 is set equal to 0; while if the corr_I_sign value 416-1 is equal to 1 (a negative value), then the correct carrier phase is 180° and carrier phase signal 294 is set equal to 1. However, if the maximum correlated value is a quadrature correlated value 421-2, then the associated corr_Q_sign value 416-2 determines the correct carrier phase. For example, if the corr_Q_sign value 416-2 is equal to 0 (a positive value), then the correct carrier phase is 90° and carrier phase signal 294 is set equal to 2; while if the corr_Q_sign value 416-2 is equal to 1 (a negative value), then the correct carrier phase is 270° (−90°) and carrier phase signal 294 is set equal to 3.

As noted above, carrier phase detector 280 provides carrier phase signal 294 to demodulator 275 (of FIG. 4). In this embodiment, carrier phase signal 294 conveys a value of 0, 1, 2 or 3 when the correct phase is 0, 180, 90 or −90 degrees, respectively. Demodulator 275 is responsive to this signal and, in accordance with the principles of the invention, de-rotates its output signal by the corresponding phase offset to remove any carrier phase ambiguity at its output. Thus, demodulator 275 can correct its output signal for use by processing blocks following (or downstream from) demodulator 275 (e.g., an equalizer, trellis decoder, deinterleaver, etc. (all not shown)).

Returning to FIG. 5, the output signals from detector 290 are provided to the centroid calculation loop to determine the virtual center value 136 as described earlier for the centroid calculator shown in FIG. 1. In this embodiment of the invention, centroid calculator 200 processes the data with carrier phase ambiguity and does not correct it in its own operation, since it does not receive a complex (I & Q) input, but just a in-phase input.

Figure 11:
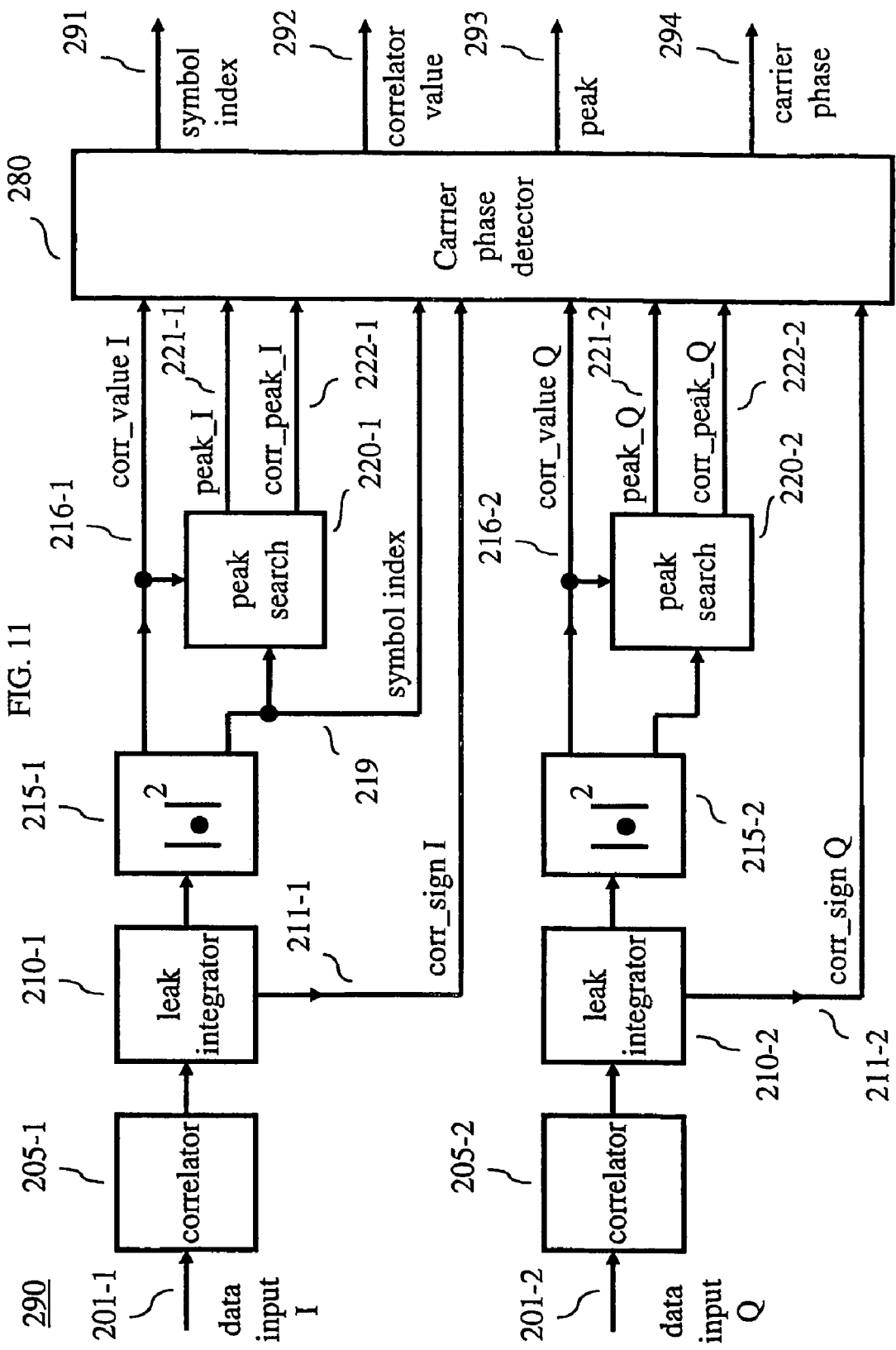
FIG. 11 shows another illustrative embodiment in accordance with the principles of the invention.

Referring now to FIG. 11, another embodiment of detector 290 in accordance with the principles of the invention is shown, for which carrier phase ambiguity is identified and corrected prior to the centroid calculation. In this example, detector 290 operates on one sample per symbol period, T, and uses complex data, i.e., the in-phase (I) component (201-1) of the data input signal (201) and the quadrature (Q) component (201-2) of the data input signal (201). The embodiment illustrated in FIG. 11 is similar to that shown in FIG. 6, with some key differences. First, both the in-phase component, 201-1, and the quadrature component, 201-2, are independently processed by respective segment sync detectors, leak integrators, squarers and peak search elements. In particular the in-phase component 201-1 is processed by correlator (segment sync detector) 205-1, leak integrator 210-1, squarer 215-1 and peak search element 220-1; while the quadrature component 201-2 is processed by correlator (segment sync detector) 205-2, leak integrator 210-2, squarer 215-2 and peak search element 220-2. Second, the peak search elements 220-1 and 220-2 are similar to the ones described earlier but have the added feature of providing the correlated values (corr_peak_I 222-1 and corr_peak-Q 222-2) associated with the respective peak values (peak_I 221-1 and peak_Q 221-2). These correlated values (corr_peak_I 222-1 and corr_peak_Q 222-2) are the maximum correlated value among the 832 values searched for the centroid calculator based on the segment sync signal, and the peak values (peak_I 221-1 and peak_Q 221-2) are the symbol indexes associated with the maximum correlated value. Finally, phase detector 280 in this illustrative embodiment is simpler than the one described above in FIG. 9.

In this example, the carrier phase ambiguity has only four possible carrier phases: 0°, 90°, 180° and 270° (or −90°) and carrier phase detector 280 of FIG. 11 performs a flow chart similar to that shown in FIG. 7, albeit with the differences described below. In step 305 of FIG. 7, carrier phase detector 280 of FIG. 11 waits for completion of the peak search. After completion of the peak search, carrier phase detector 280 provides output signals 291, 292, 293 and 294 in step 310 of FIG. 7. These output signals 291, 292 and 293 are applied to the remainder of the elements of centroid calculator 200 as illustrated in FIG. 5 and the processing proceeds as described earlier for the centroid calculator shown in FIG. 1.

With respect to the output signals, the symbol index 291 is set equal to the value of symbol index 219. The remainder of the output signals are provided in step 310 according to the following rules. In particular, if the value of corr_peak_I 222-1 is greater than, or equal to, the value of corr_peak_Q 222-2, then the associated corr_I_sign value 211-1 determines the correct carrier phase. For example, if the corr_I_sign value 211-1 is equal to 0 (a positive value), then the correct carrier phase is 0° and carrier phase signal 294 is set equal to 0, peak signal 293 is set equal to peak_I_signal 221-1 and correlator value signal 292 is set equal to corr_value I 216-1; while if the corr_I_sign value 211-1 is equal to 1 (a negative value), then the correct carrier phase is 180° and carrier phase signal 294 is set equal to 1, peak signal 293 is set equal to peak_I signal 221-1 and correlator value signal 292 is set equal to corr_value I 216-1. However, if the value of corr_peak_I 222-1 is less than the value of corr_peak_Q 222-2, then the associated corr_Q sign value 211-2 determines the correct carrier phase. For example, if the corr_Q_sign value 211-2 is equal to 0 (a positive value), then the correct carrier phase is 90° and carrier phase signal 294 is set equal to 2, peak signal 293 is set equal to peak_Q signal 221-2 and correlator value signal 292 is set equal to corr_value Q 216-2; while if the corr_Q_sign value 211-2 is equal to 1 (a negative value), then the correct carrier phase is 270° (−90°) and carrier phase signal 294 is set equal to 3, peak signal 293 is set equal to peak_Q signal 221-2 and correlator value signal 292 is set equal to corr_value Q 216-2.

Figure 7:
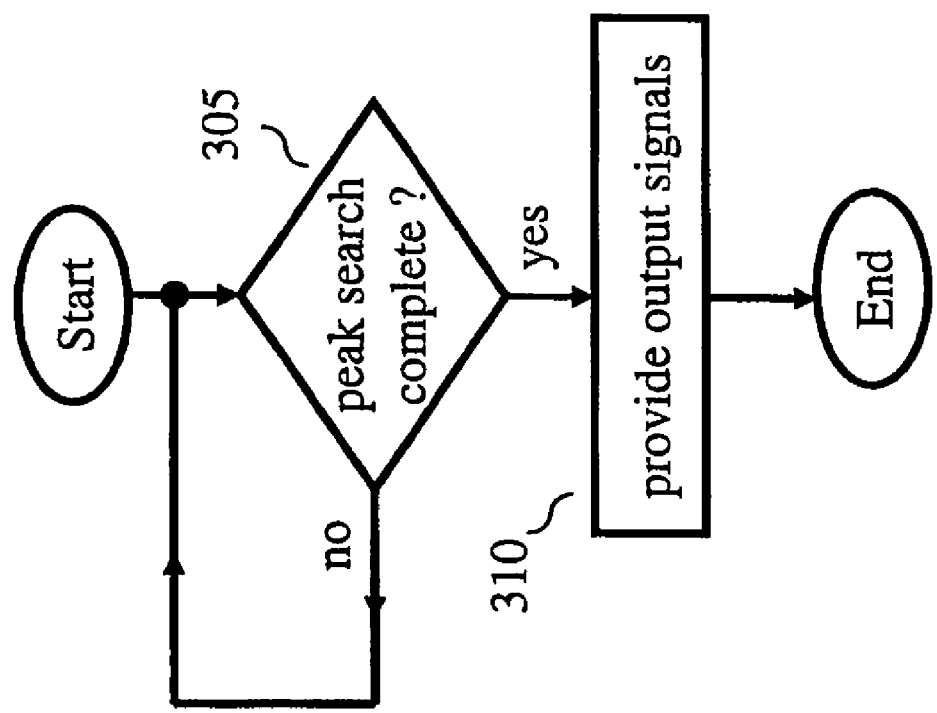
FIG. 7 shows an illustrative flow chart for use in a receiver in accordance with the principles of the invention.

In another embodiment in accordance with the principles of the invention, the centroid calculator is similar to the one described above and shown in FIGS. 5 and 11, except that in step 310 of FIG. 7 carrier phase detector 280 always provides output signal correlator value 292 as the sum of (corr_value I 216-1+corr_value Q 216-2).

In yet another embodiment in accordance with the principles of the invention, the centroid calculator is extended to process N samples per symbol at a time (fractional), where N is an integer and N≧2, in-phase data input, only (as in the first embodiment shown in FIGS. 5 and 6). In this embodiment, which is an extension to the embodiments shown in FIGS. 6 and 9, carrier phase detector 280 processes N samples. For the N sample-per-symbol centroid calculator, the segment sync integrators are illustratively T/N spaced, where T is the symbol period. In addition, the segment sync correlators have T/N spaced values that match with the T/N spaced segment sync characteristic, the leak integrators are N×832 long and the symbol index repeats each value N times. For example, it follows the pattern 0, 0, 1, 1, 2, 2, . . . , 831, 831, when N=2 instead of 0, 1, 2, . . . , 831 when N=1. Also, the pattern representations in Table One of FIG. 8 are made to be T/N spaced, which reflects in the design of the phase correlators I and Q as well as the leak integrators in FIG. 9. Finally, in the phase peak search algorithm, there are N values for each symbol index value in steps 510 and 515 of FIG. 10 and, in step 520, the search for the maximum value among I and Q samples will increase by a factor of N to a total of (6*N) values.

Figure 12:
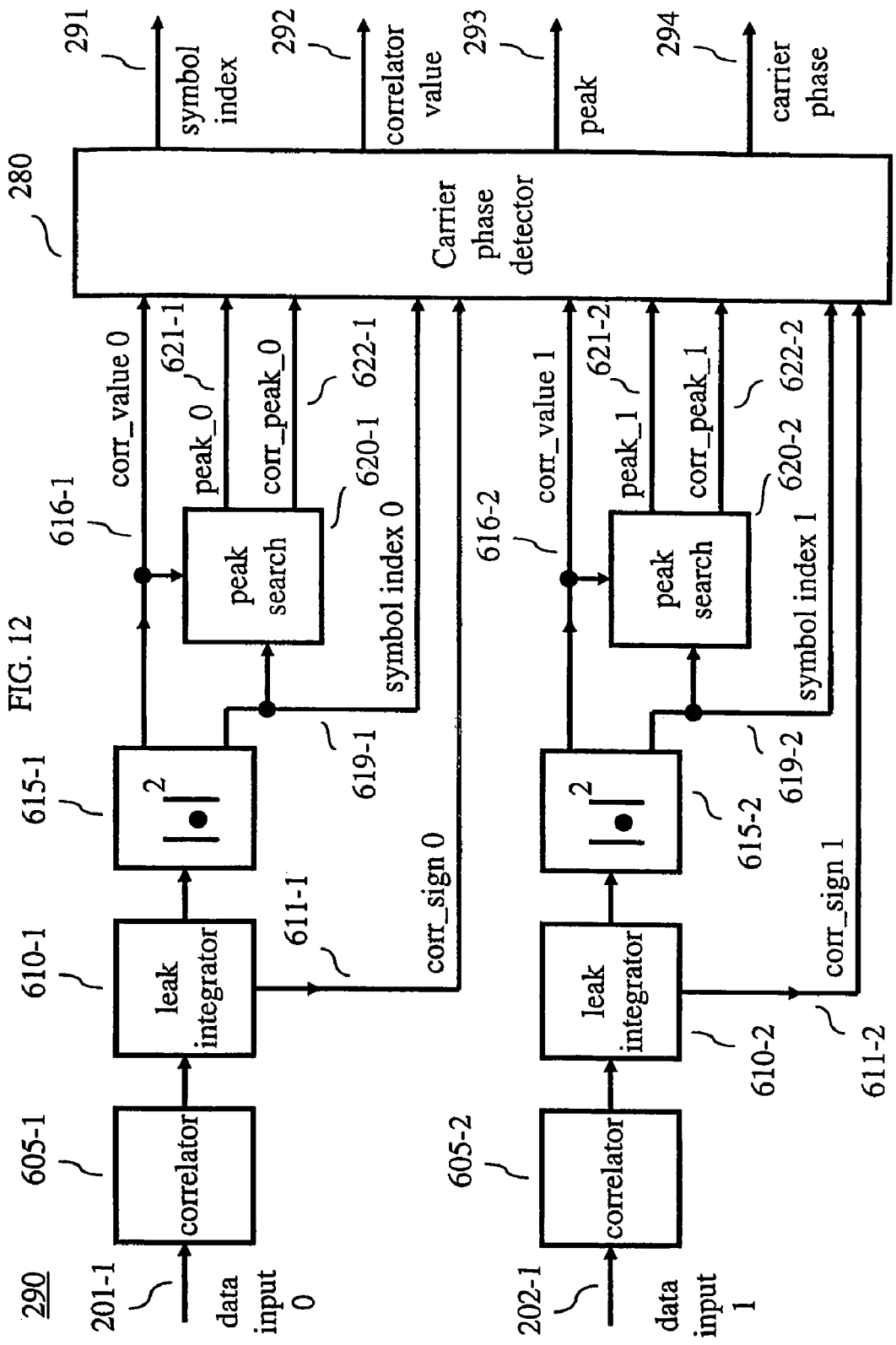
FIG. 12 shows another illustrative embodiment in accordance with the principles of the invention.

Turning now to FIG. 12, an illustrative embodiment of detector 290 for N=2 is shown. In this example, detector 290 operates on two samples per symbol period, T, and uses the in-phase component of the data input signal 201. In FIG. 12, data input signal 201 comprises two samples: a first sample represented by data input 0 (201-1) and a second sample represented by data input 1 (202-1). In this regard, it is assumed that demodulator 275 of FIG. 4 is either a serial-output demodulator or a parallel-output demodulator. If demodulator 275 is a serial-output demodulator, then demodulator 275 provides data input 0 and data input 1 as a sequence of alternating samples associated with a demodulator clock (not shown). On the other hand, if demodulator 725 is a parallel-output demodulator, then demodulator 275 provides data input 0 and data input 1 as a pair of samples at the same time associated with the demodulator clock (not shown). In either case, the demodulator clock may have a frequency of twice the symbol rate (1/T) or higher. If the clock frequency is higher than twice the symbol rate, a sample enable (not shown) identifies when the samples are available with respect to the demodulator clock. For the sake of simplicity and without loss of generality, it is assumed in the following that the clock frequency is equal to the symbol rate (1/T) and that demodulator 275 is a parallel-output demodulator.

As can be observed from FIG. 12, each sample is processed in a similar fashion. In particular, data input 0 is processed by a correlator (segment sync detector) 605-1, leak integrator 610-1, squarer 615-1 and peak search element 620-1. Likewise, data input 1 is processed by a correlator (segment sync detector) 605-2, leak integrator 610-2, squarer 615-2 and peak search element 620-2. Output signals from these two processing paths are applied to carrier phase detector 280, which provides a symbol index value 291, a correlator value 292, a peak value 293 and a carrier phase value 294, in accordance with the principles described above.

In another embodiment in accordance with the principles of the invention, the centroid calculator is extended to process N-samples per symbol at a time (fractional), where N is an integer and N≧2, in-phase and quadrature data input (as in the second and third embodiments) as shown in FIG. 11. The extension of the inventive concept does not alter the carrier phase detector algorithm described with respect to FIG. 9. For the N sample-per-symbol centroid calculator, the segment sync integrators are illustratively T/N spaced, where T is the symbol period. In addition, the segment sync correlators have T/N spaced-values that match with the T/N spaced segment sync characteristic, the leak integrators are N×832 long and the symbol index repeats each value N times. For example, it follows the pattern 0, 0, 1, 1, 2, 2, . . . , 831, 831, when N=2 instead of 0, 1, 2, . . . , 831 when N=1.

Figure 13:
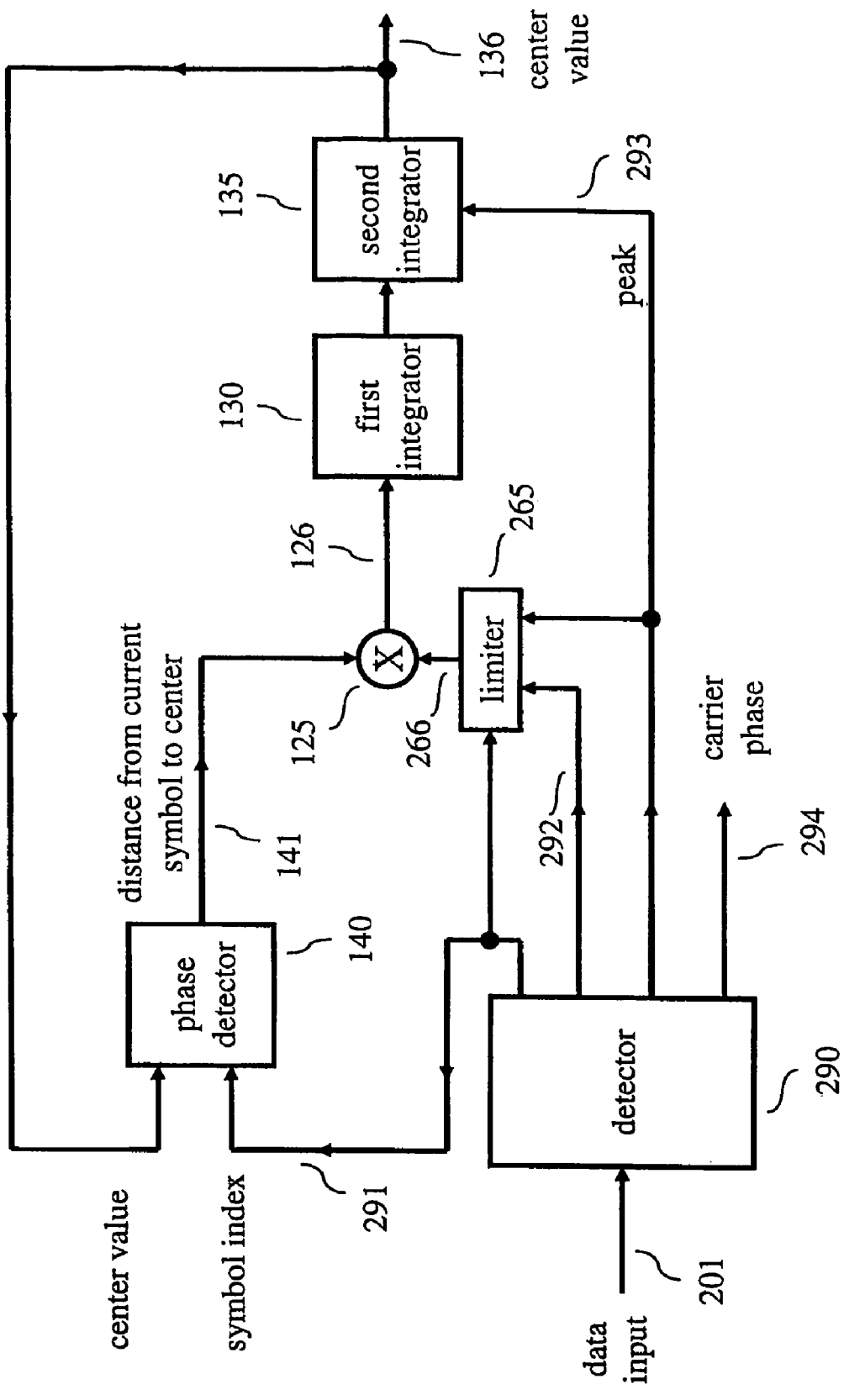
FIGS. 13-15 show other illustrative embodiments in accordance with the principles of the invention.
Figure 14:
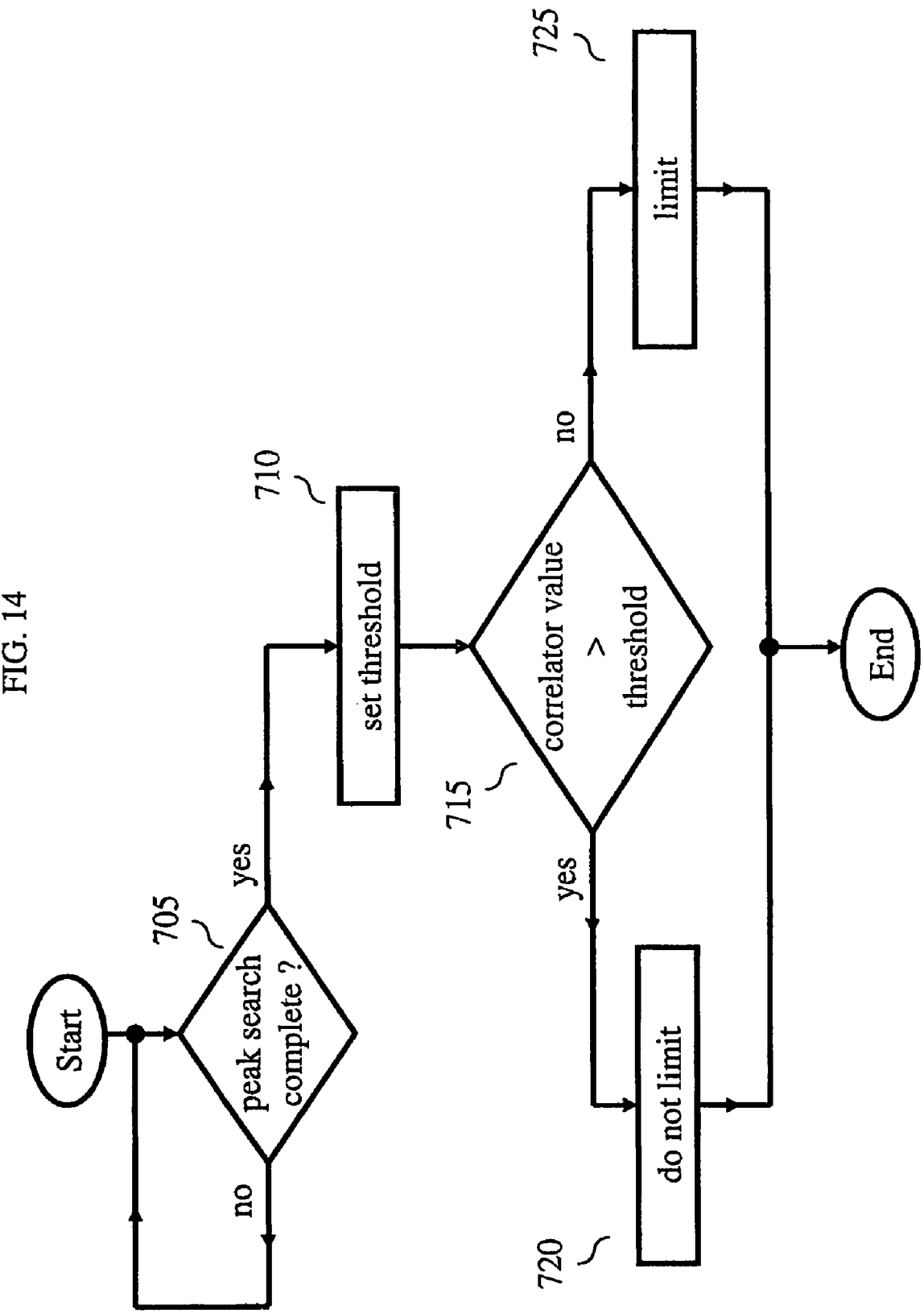

Turning now to FIG. 13, another illustrative embodiment is shown. This embodiment is similar to that shown in FIG. 5 except for the inclusion of limiter 265 prior to the weighting operation performed by multiplier 125. The operation of limiter 265 is shown in the illustrative flow chart of FIG. 14. In step 705, limiter 265 waits for completion of the peak search. Once the peak search is complete, limiter 265 sets a threshold value in step 710. Illustratively, the threshold value is set equal to the (peak/K), where the value of K is chosen experimentally. In step 715, limiter 265 determines if the correlator value (292) is greater than the set threshold value. If the correlator value (292) is greater than the set threshold value, then limiter 265 does not limit the correlator value (292) in step 720, i.e., the value of signal 266 is equal to the value of signal 292 in FIG. 13. However, if the correlator value (292) is less than, or equal to, the threshold value, then limiter 265 sets the value of signal 266 equal to an illustrative limiter value, L, in step 725. In this example, L is equal to zero. As a result, in step 725, signal 266 is set equal to zero.

The idea behind limiter 265 is due to the fact that the concept of correlation and the assumption that random data and noise accumulate to zero in integrators assumes large samples, approaching an unbounded sequence size. However, the centroid calculation and consequent integrations happen within a limited amount of time. In fact, since the time for a centroid calculation affects the overall time for a receiver to lock, it is of interest to minimize the centroid calculator time. Therefore, there is a residual noise in the integrators associated with the data input and actual input noise, which is also a function of the centroid calculator operating time. This residual noise is not likely to affect the peak search, except in channels with zero or near zero dB ghosts. But since the weighted values (signal 126 of FIG. 13) are a product of correlated values times the distance from the current symbol to the center, noise in positions far away from the peak value may contribute substantially to the final calculation. As such, by providing a limiter as described above, the residual noise in the correlator integrators can be eliminated, improving the weighted value estimate. This limiter is more efficient if the threshold is a function of the peak value, eliminating excessive limiting in mismatched operation due to possible demodulator carrier phase and symbol timing ambiguities, or Automatic Gain Control (AGC) mismatch.

The disadvantage of the use of a limiter is that in theory, the centroid calculator will be limited to only include ghosts above a certain strength level, since small levels will be disregarded by the limiter 265. However, proper choice of the constant K in step 710 will define a balance between which correlated values are the result of residual noise and which values are actual ghosts. Any ghost strength levels that are below the residual noise levels would not be properly addressed by the centroid calculator either with or without a limiter. As an example, for $K=2^6$, the limiter disregards any ghosts that are approximately 18 dB below the main signal.

Figure 15:
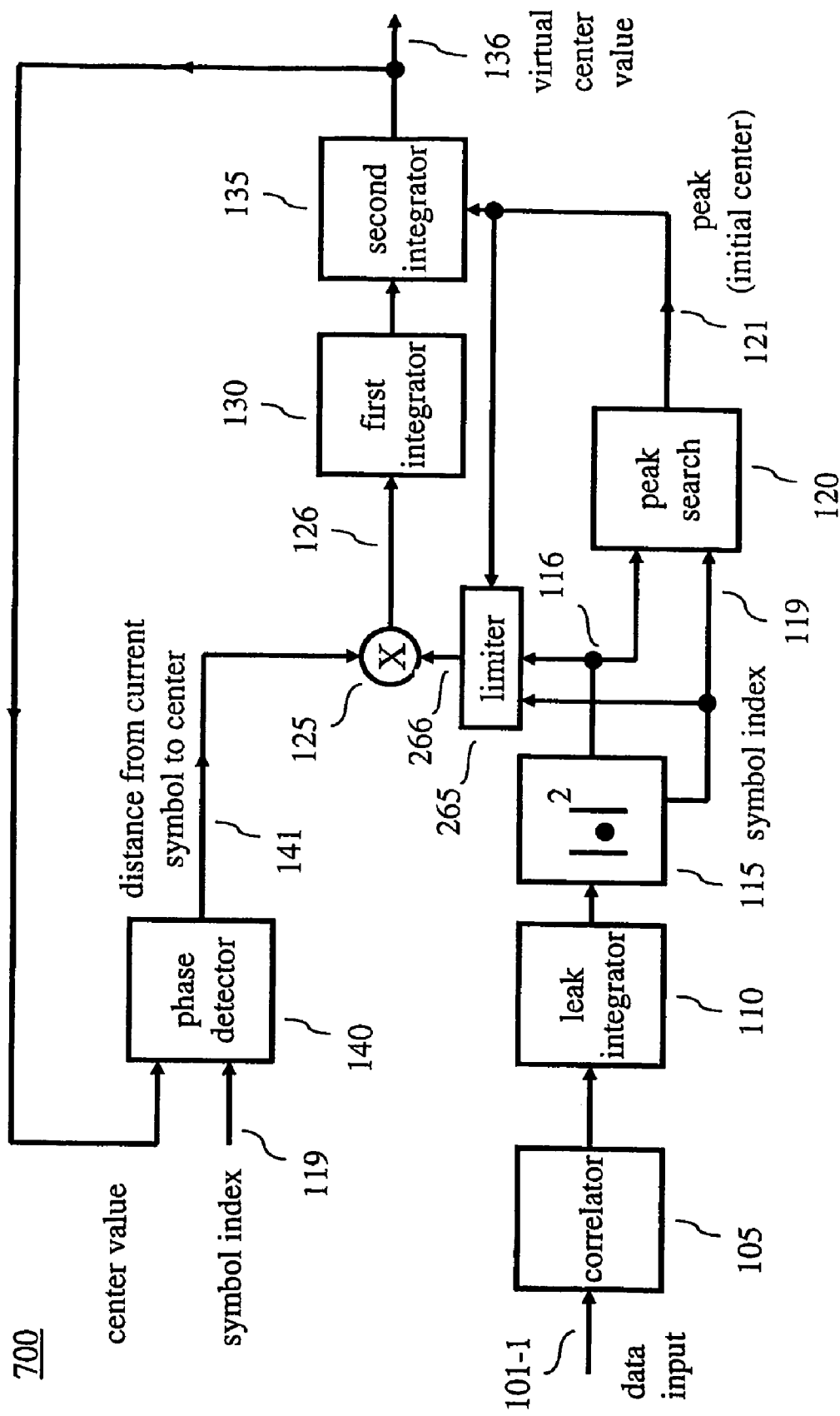

The addition of a limiter to a centroid calculator applies to all of the embodiments described herein. For example, another illustrative embodiment 700 in accordance with the principles of the invention, is shown in FIG. 15. This figure is similar to the embodiment shown in FIG. 1, except for the addition of limiter 265. The latter functions as described above with respect to the flow chart of FIG. 14.

All the illustrative embodiments described herein in accordance with the principles of the invention can be based on any sync signal. The correlator compares the input data with the sync signal of choice. In the context of ATSC-DTV, some candidates are the segment sync signal or the frame sync signal. For these types of sync signals the difference is in the choice of the correlator and in the size of the integrators to accommodate the type and size of the sync signal.

Likewise, all of the illustrative embodiments described herein in accordance with the principles of the invention can be based on any type training signal of any digital communications system. In this case, the correlator compares the input data with the training signal in question. For all the embodiments described herein in accordance with the principles of the invention, the virtual center calculation certainly happens at the beginning of signal reception, but the process can continue on so that the optimum virtual center position is constantly updated based on the channel conditions and the virtual center can be shifted according to the updated virtual center position by slowly changing the sampling clock frequency accordingly. The same updates should then be made for the time phase output.

For all the embodiments described herein in accordance with the principles of the invention, once the weighted center, which is also the virtual center of the equalizer, is determined, the reference signals, such as the segment sync and the frame sync signal are locally re-generated in the receiver to line up at the virtual center. As a result, taps will grow in the equalizer to equalize the channel such that the equalized data output will be lined up at the virtual center.

For all the embodiments described herein in accordance with the principles of the invention, the blocks strictly associated with the generation of the output carrier phase may be implemented separately from the remainder of the centroid calculator and used for the purpose of correcting carrier phase ambiguity in the demodulator.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements of may be implemented in a stored-program-controlled processor, e.g., a digital signal processor, which executes associated software, e.g., corresponding to one or more of the steps shown, e.g., in FIGS. 7, 10 and/or 14. Further, although shown as elements bundled within TV set 10, the elements therein may be distributed in different units in any combination thereof. For example, receiver 15 of FIG. 3 may be a part of a device, or box, such as a set-top box that is physically separate from the device, or box, incorporating display 20, etc. Also, it should be noted that although described in the context of terrestrial broadcast, the principles of the invention are applicable to other types of communications systems, e.g., satellite, cable, etc. It is therefore to be understood that numerous modifications may be made to the illustrative embodiments and that other arrangements may be devised without departing from the spirit and scope of the present invention as defined by the appended claims.

The invention claimed is:

1. A receiver, comprising:
   a demodulator for providing a demodulated signal; and
   a centroid calculator responsive to the demodulated signal for providing a virtual center value for a channel impulse response;
   wherein the centroid calculator is also responsive to the demodulated signal for identifying a correct carrier phase for use in removing carrier phase ambiguity in the demodulator
   wherein the centroid calculator includes a limiter for limiting correlation values therein as a function of a threshold value.

2. The receiver of claim 1, wherein the demodulated signal comprises $N \geq 1$ samples per symbol period, T.

3. The receiver of claim 2, wherein each of the N signal samples are complex.

4. The receiver of claim 1, wherein the centroid calculator identifies the correct carrier phase for use in removing carrier phase ambiguity prior to providing a centroid calculation.

5. The receiver of claim 1, wherein the centroid calculator comprises:
a detector responsive to the demodulated signal for identifying the correct carrier phase and for providing the identified correct carrier phase to the demodulator.

6. The receiver of claim 5, wherein the centroid calculator uses the identified correct carrier phase for providing a centroid calculation.

7. The receiver of claim 5, wherein the detector comprises:
at least one processing path for correlating the demodulated signal to a synchronization signal, wherein the processing path comprises a correlator and a leak integrator for use in providing a correlation value and a sign of the correlation value; and
a carrier phase detector that identifies the correct carrier phase as a function of the sign of the correlation value.

8. The receiver of claim 7, wherein the synchronization signal is an ATSC-DTV (Advanced Television Systems Committee-Digital Television) segment sync signal.

9. The receiver of claim 7, wherein the synchronization signal is an ATSC-DTV (Advanced Television Systems Committee-Digital Television) frame sync signal.

10. The receiver of claim 1, wherein the threshold value is a function of a peak correlation value.

11. A method for use in a receiver, the method comprising:
providing a demodulated signal; and
determining a virtual center for a channel impulse response from the demodulated signal;
wherein the determining step includes the steps of
identifying a correct carrier phase for use in removing carrier phase ambiguity in a demodulator; and
limiting correlation values as a function of a threshold value.

12. The method of claim 11, wherein the demodulated signal comprises $N \geq 1$ samples per symbol period, T.

13. The method of claim 12, wherein each of the N signal samples are complex.

14. The method of claim 11, wherein the determining step identifies the correct carrier phase for use in removing carrier phase ambiguity prior to determining the virtual center.

15. The method of claim 11, wherein the determining step includes the step of:
providing the identified correct carrier phase to the demodulator.

16. The method of claim 11, wherein the determining step includes the steps of:
correlating the demodulated signal to a synchronization signal for providing a correlation value and a sign of the correlation value; and
identifying the correct carrier phase as a function of the sign of the correlation value.

17. The method of claim 16, wherein the synchronization signal is an ATSC-DTV (Advanced Television Systems Committee-Digital Television) segment sync signal.

18. The method of claim 16, wherein the synchronization signal is an ATSC-DTV (Advanced Television Systems Committee-Digital Television) frame sync signal.

19. The method of claim 11, wherein the threshold value is a function of a peak correlation value.

* * * * *